United States Patent
Numano (10) Patent No.: US 7,292,206 B2
(45) Date of Patent: Nov. 6, 2007

(54) INFORMATION PROCESSING APPARATUS AND METHOD OF OPERATING POINTING DEVICE

(75) Inventor: Fujihito Numano, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 708 days.

(21) Appl. No.: 10/767,267

(22) Filed: Jan. 30, 2004

(65) Prior Publication Data
US 2004/0239621 A1 Dec. 2, 2004

(30) Foreign Application Priority Data
Jan. 31, 2003 (JP) .............................. 2003-024419

(51) Int. Cl.
*G09G 5/00* (2006.01)
(52) U.S. Cl. ........................................ 345/1.1; 345/173
(58) Field of Classification Search .......... 345/1.1–1.2, 345/1.3, 2.1, 2.2–2.3, 3.1–3.2, 3.3–3.4, 156–163, 345/169, 172, 173–175, 901–903, 211–213; 361/681, 686
See application file for complete search history.

(56) References Cited

U.S. PATENT DOCUMENTS

| | | | | |
|---|---|---|---|---|
| 5,923,307 A | * | 7/1999 | Hogle, IV ....................... | 345/4 |
| 5,926,165 A | * | 7/1999 | Grewer et al. ............... | 715/800 |
| 6,407,779 B1 | * | 6/2002 | Herz .......................... | 348/734 |
| 6,670,950 B1 | * | 12/2003 | Chin et al. ................... | 345/173 |
| 2005/0024341 A1 | * | 2/2005 | Gillespie et al. ............ | 345/173 |

FOREIGN PATENT DOCUMENTS

| | | |
|---|---|---|
| JP | 2000-279399 | 10/2000 |
| JP | 2000-339097 | 12/2000 |

OTHER PUBLICATIONS

Notification of Reasons for Rejection in Japanese Patent Application No. 2003-024419.

* cited by examiner

*Primary Examiner*—Richard Hjerpe
*Assistant Examiner*—Mansour M. Said
(74) *Attorney, Agent, or Firm*—Finnegan, Henderson, Farabow, Garrett & Dunner, L.L.P.

(57) ABSTRACT

An information processing apparatus comprises a first display device which displays a pointer, a second display device which displays a virtual screen including a screen of the first display device, and a display controller which moves the pointer to a pointed position in the virtual screen of the second display device.

16 Claims, 7 Drawing Sheets

INFORMATION PROCESSING APPARATUS AND METHOD OF OPERATING POINTING DEVICE

CROSS-REFERENCE TO RELATED APPLICATIONS

This application is based upon and claims the benefit of priority from the prior Japanese Patent Application No. 2003-024419, filed Jan. 31, 2003, the entire contents of which are incorporated herein by reference.

BACKGROUND OF THE INVENTION

1. Field of the Invention

The present invention relates to an information processing apparatus which uses a pointing device and is capable of an input operation, and to a method of operating the pointing device.

2. Description of the Related Art

Portable personal computers of a notebook type or laptop type have recently been provided with a pointing device which enables, for example, a mouse pointing operation and a numeric key input operation (e.g., refer to Japanese Patent KOKAI Publication No. 2000-339097).

In this prior art, an LCD is disposed behind a touch pad made of a transparent material. The touch pad is used as the pointing device to designate a position on an LCD screen, thereby inputting a trajectory of a point. The pointing device is used to input a trajectory of an index (pointer) which is displayed on the display screen of the LCD and moved in response to an input operation.

In the pointing device of this kind, moving a mouse pointer to a desired position in an actual display area or on a virtual screen has been accomplished by a sliding operation of the pointing device on the touch pad, a moving operation of a mouse, a rolling operation of a track ball, a cursor key operation on a keyboard and the like.

A size of the touch pad is naturally smaller than a screen size of a main display device, so that the above-mentioned operations need to be repeated for a plurality of times to move the mouse pointer for a long distance in a state where a fine pitch is set for a movement amount of the pointer of the pointing device, which is a problem in operability. To avoid this, if a greater pitch is set for the movement amount of the pointer of the pointing device, a movement speed of the mouse pointer can be higher and thus the number of repeating operations can be reduced. This, however, makes it difficult to finely adjust the position of the mouse pointer, and again forces poor operability.

Furthermore, in a state where the virtual screen (desktop) larger than the actual display area is set, and only part of the desktop is displayed on the main display device and a movement end of the mouse pointer is not displayed on the main display device, a panning operation is required to move the display area within the virtual screen, which poses a problem that the operability becomes worse.

BRIEF SUMMARY OF THE INVENTION

The present invention is directed to method and apparatus that substantially obviates one or more of the problems due to limitations and disadvantages of the related art.

According to an embodiment of the present invention, an information processing apparatus comprises:

a first display device which displays a pointer;

a second display device which displays a virtual screen including a screen of the first display device; and a display controller which moves the pointer to a pointed position in the virtual screen of the second display device.

According to an embodiment of the present invention, a method of operating pointing device comprising:

displaying a screen on which an operation based on a pointer is enabled on a first display device;

displaying a virtual screen including the screen of the first display device on a second display device; and moving the pointer to a pointed position in the virtual screen of the second display device based on a pointing operation on the virtual screen.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of an information processing apparatus according to the present invention will now be described with reference to the accompanying drawings.

Figure 1:
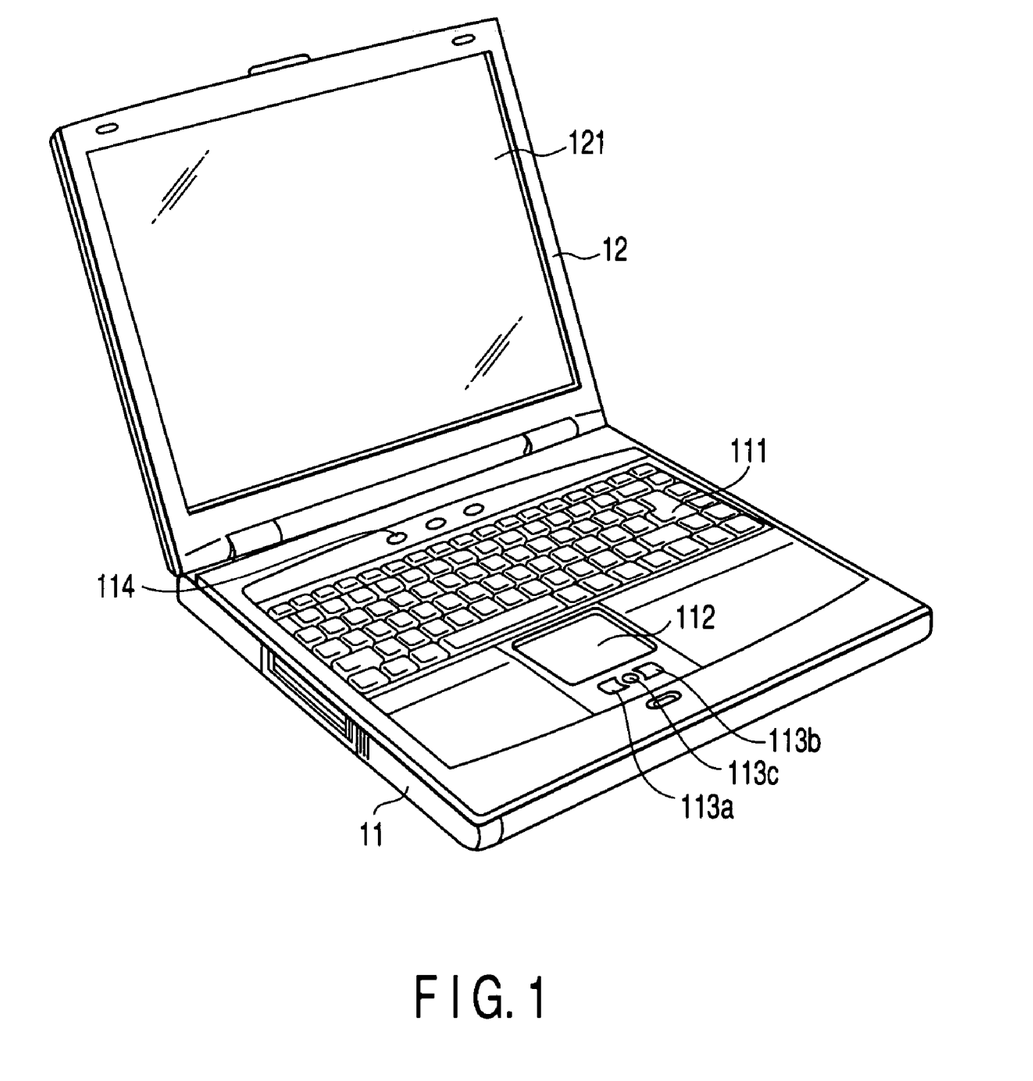
FIG. 1 is a perspective view showing an external configuration of an information processing apparatus according to an embodiment of the present invention.

FIG. 1 is a perspective view showing an external configuration of an information processing apparatus according to an embodiment of the present invention. A notebook-type personal computer is shown here as an example.

The notebook-type personal computer comprises a computer main body 11 and a display unit 12. A main display device 121 including an LCD is built into the display unit 12. The display unit 12 is attached to the computer main body 11 rotatably between an open position and a closed position.

The computer main body 11 has a thin box-shaped case, and on an upper surface of the case, a power button 114 for turning on/off a power supply of the computer main body 11, a keyboard 111 and the like are disposed. An armrest is formed on the upper surface of the case portion before the keyboard 111. In an almost central portion of the armrest, a sub display device (touch pad device) 112 having a touch screen function is provided. The sub display device 112 forms a display-integrated type pointing device which is integrally provided with a display panel, such as the LCD having a display screen size smaller than that of the main display device 121, and a tablet, and this sub display device 112 is disposed on the upper surface of the case forming the armrest, together with a left button 113a, a right button 113b and a middle button 113c. The tablet is made of a transparent material, and the display panel is provided at the back of the tablet.

Figure 2:
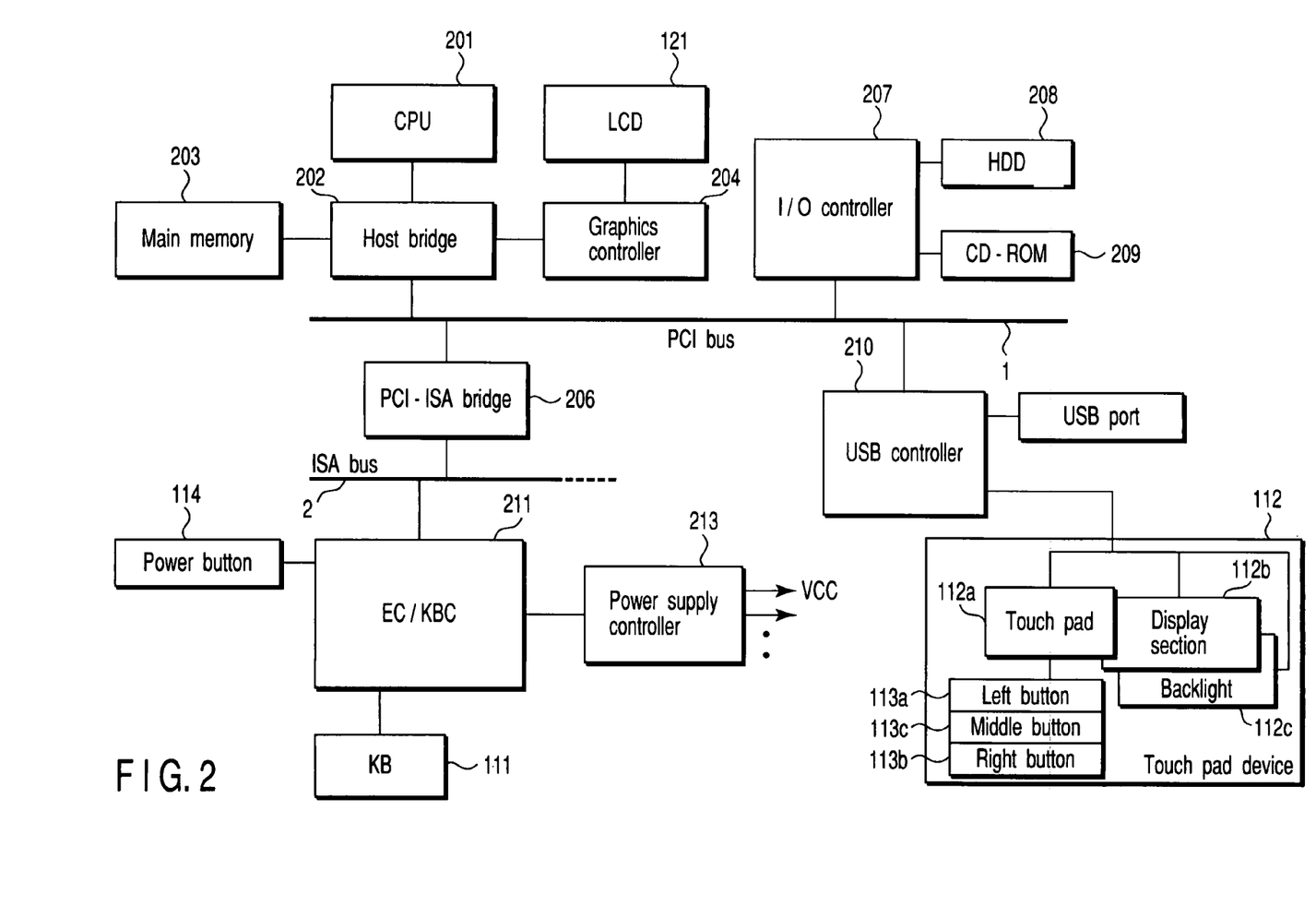
FIG. 2 is a block diagram showing a system configuration of the information processing apparatus.

FIG. 2 is a block diagram showing a system configuration of the computer shown in FIG. 1. The present system comprises a CPU 201, a host bridge 202, a main memory 203, a graphics controller 204, a PCI-ISA bridge 206, an I/O controller 207, a hard disk drive (HDD) 208, a CD-ROM drive 209, a USB controller 210, an embedded controller/keyboard controller IC (EC/KBC) 211, a power supply controller 213 and the like.

The sub display device 112 mentioned above is connected to the USB controller 210. The sub display device 112 integrates a touch pad 112a, a display section 112b and a backlight 112c to enable a touch screen function, and includes the left button 113a, the right button 113b and the middle button 113c.

The CPU 201 controls an operation of the present embodiment, and executes an operating system (OS) loaded into the main memory 203 from the hard disk drive (HDD) 208, application programs, utility programs and the like. In this embodiment, the CPU 201 executes processing of a control program (see FIG. 3) for the sub display device 112 and processing of an input-output program to enable a positioning processing function of a mouse pointer through one-touch operation on the sub display device 112 shown in FIG. 5 described later in collaboration with a mouse driver.

The host bridge 202 is a bride device which bi-directionally connects a local bus of the CPU 201 and a PCI bus 1. The graphics controller 204 comprises a video RAM (VRAM), and controls the main display device 121 used as a display monitor of the present embodiment under the control of a dedicated display driver. The I/O controller 207 controls the hard disk drive (HDD) 208, the CD-ROM drive 209 and the like. The PCI-ISA bridge 206 is a bridge device which bi-directionally connects the PCI bus 1 and an ISA bus 2, and various kinds of system devices such as a system timer, a DMA controller and an interrupt controller are built therein.

The embedded controller/keyboard controller IC (EC/KBC) 211 is a one-chip microcomputer in which an embedded controller (EC) for power management and a keyboard controller (KBC) for controlling the keyboard 111 are integrated. The embedded controller/keyboard controller IC (EC/KBC) 211 has a function to power on/off the present embodiment in accordance with an operation of the power button 114 by a user in collaboration with the power supply controller 213.

Figure 3:
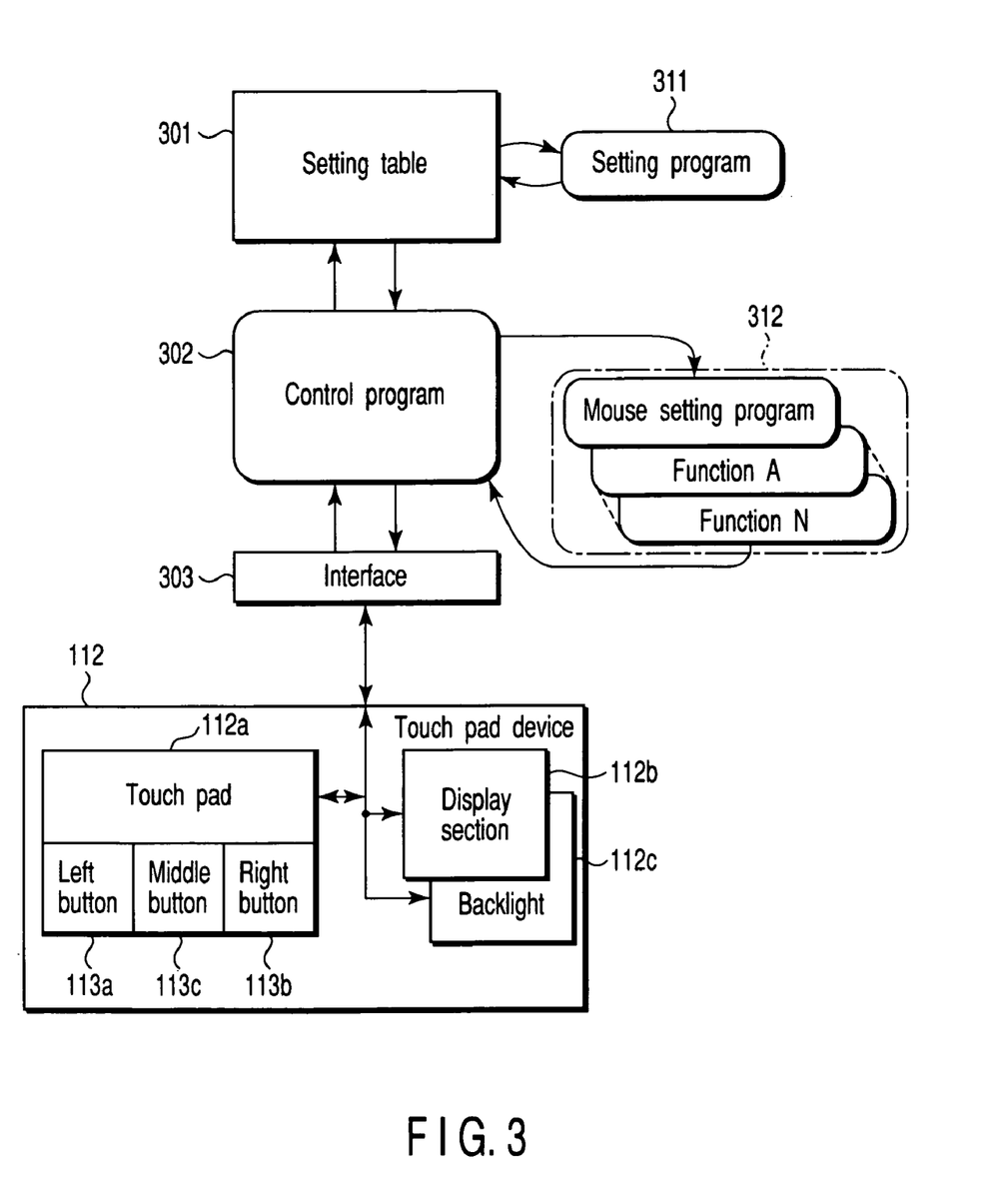
FIG. 3 is a diagram showing functional components of a sub display device in the information processing apparatus.

FIG. 3 is a diagram showing functional components of the sub display device 112 in the embodiment of the present invention, and the components here include a setting table 301 which sets a function of the sub display device 112; a control program 302 which controls the function of the sub display device 112 in accordance with contents of the setting table 301; an interface 303 which controls input and output of information exchanged between the sub display device 112 and the control program 302; a setting program 311 which creates the setting table 301 by use of a GUI; execution means 312 for executing various kinds of processing in accordance with instructions from the control program 302; and the sub display device 112. In this embodiment, in accordance with the operation of the middle button 113c, the execution means 312 switches the function of the sub display device 112 between a pointing function following the control of the mouse setting program, that is, a pointing operation input mode (default mode) which enables the mouse pointer on the main display device 121 to move by sliding a finger on the sub display device 112, and a mouse pointer positioning function (mouse pointer touch operation input mode) through one-touch operation on a virtual screen (see FIG. 5).

Figure 4:
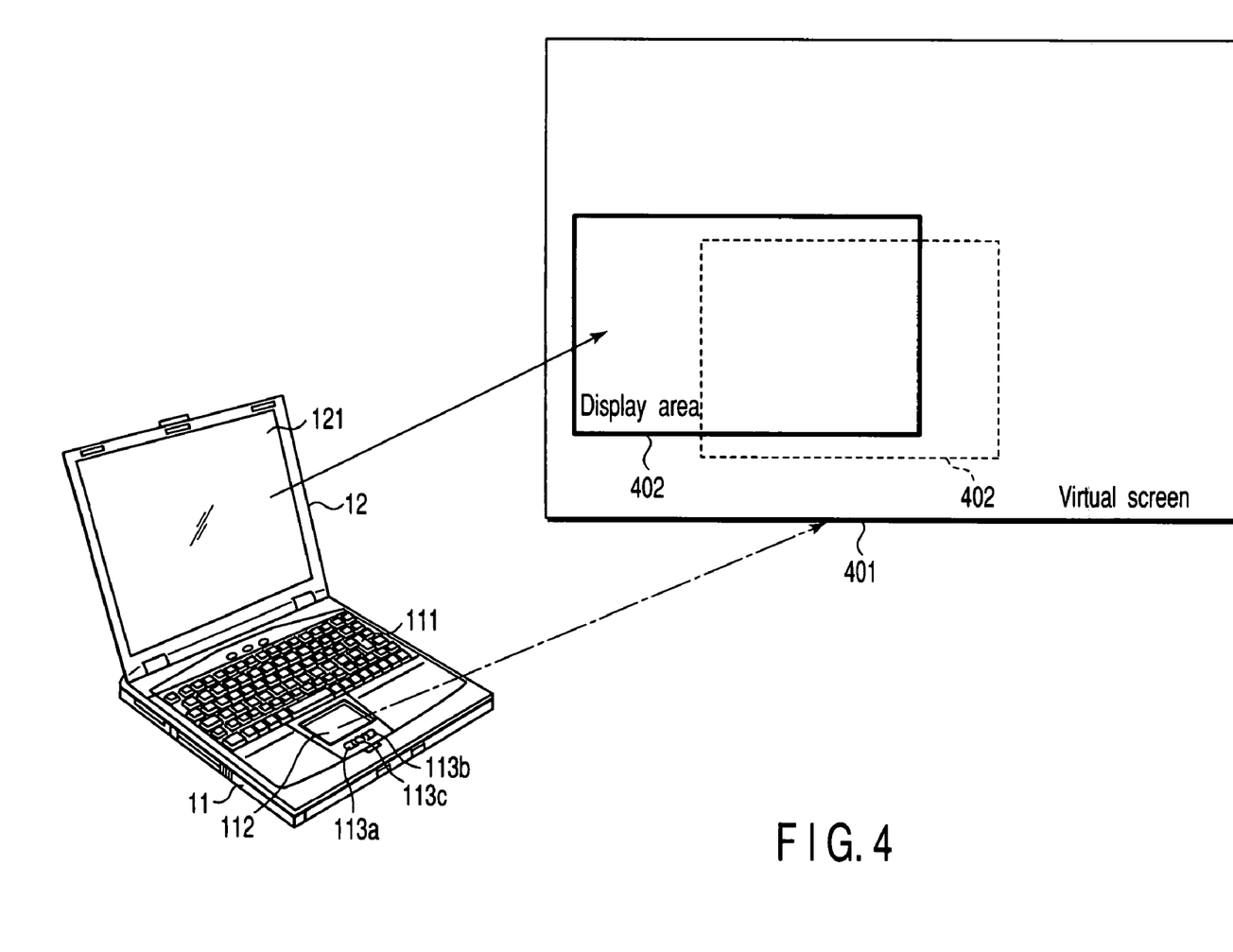
FIG. 4 is a view showing a relationship between a virtual screen (desktop entire screen) and an actual display screen.

FIG. 4 is a view showing a relationship between a virtual screen 401 dealt with by the computer main body 11 and an actual display screen 402 of the main display device 121 in the embodiment described above. It is to be noted that, in this embodiment, a desktop entire screen to be displayed on the main display device 121 is referred to as the virtual screen 401, and the actual display screen 402 presently displayed on the main display device 121 is referred to as a main operation screen.

The display screen (main display) 121 including the LCD which is used as the display monitor of the present embodiment is incorporated into the display unit 12 provided at the computer main body 11.

A screen image in a display area 402 allocated on a virtual screen 401 is displayed as the main operation screen on the main display device 121. In this embodiment, a size (resolution) of the display area 402 is the same as a size (resolution) of a display screen (actual display screen) of the main display device 121. In other words, out of the entire screen image on the virtual screen 401, only the screen image in the display area 402 is displayed as the main operation screen on the main display device 121. In this sense, the screen image in the display area 402 is the screen image on the actual display screen of the main display device 121. A position of the display area 402 can be set in an optional position within the virtual screen 401 by a panning operation, as indicated by a broken line of FIG. 4.

In this embodiment, during the positioning operation of the mouse pointer through one-touch operation on the virtual screen using the sub display device 112, panning processing is performed under the control of the input-output program when a movement end (positioning end) of the mouse pointer is out of a display position of the main operation screen displayed on the main display device 121. The panning processing is performed to quickly move the display position of the main operation screen on the basis of relative positions of the virtual screen and the movement end of the mouse pointer in such a manner that relative positions of the main operation screen and the mouse pointer before the mouse pointer has been moved is maintained. This makes it easy to recognize the position of the mouse pointer on the main operation screen even when the display position of the main operation screen is switched (panned) and enables the positioning operation of the mouse pointer to be performed more easily and quickly.

Figure 5:
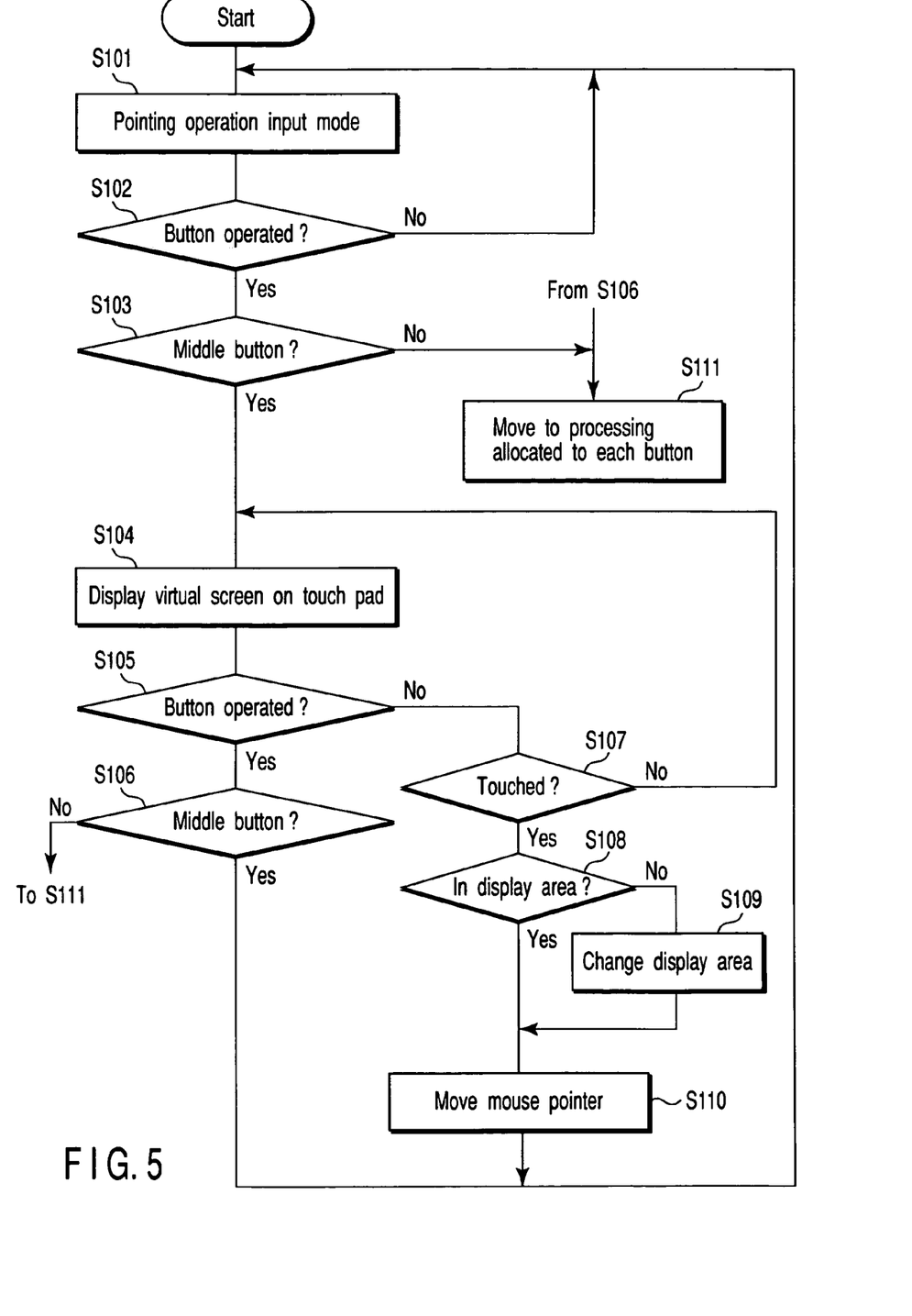
FIG. 5 is a flowchart showing a processing procedure of a pointing operation according to the embodiment.

FIG. 5 is a flowchart showing an operation processing procedure according to the embodiment of the present invention, which is achieved by a cooperative processing of the control program 302 of the sub display device 112, the mouse driver and an input-output control program. This processing enables the mouse pointer positioning function by one-touch operation on the virtual screen using the sub display device 112. Here, as an example, when the sub display device 112 is in the pointing operation input mode, the middle button 113*c* is operated so as to switch the sub display device 112 to the mouse pointer touch operation input mode which enables the mouse pointer positioning function through one-touch operation on the virtual screen using the sub display device 112.

Figure 6A:
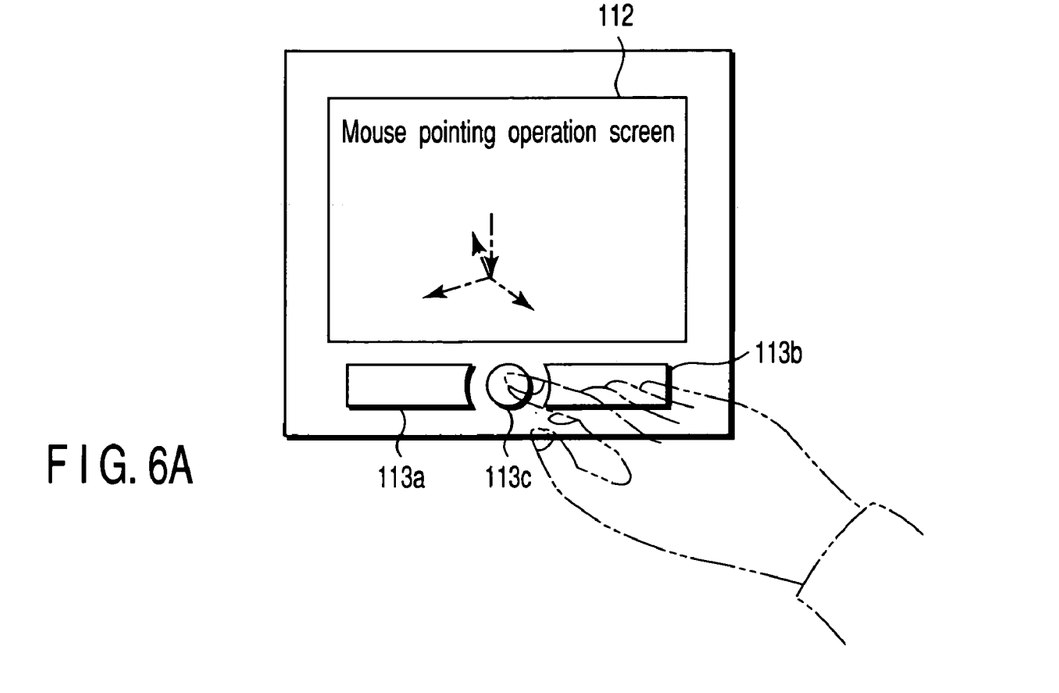
FIGS. 6A and 6B are views showing operation examples on the sub display device for explaining a positioning operation of a mouse pointer according to the embodiment.
Figure 6B:
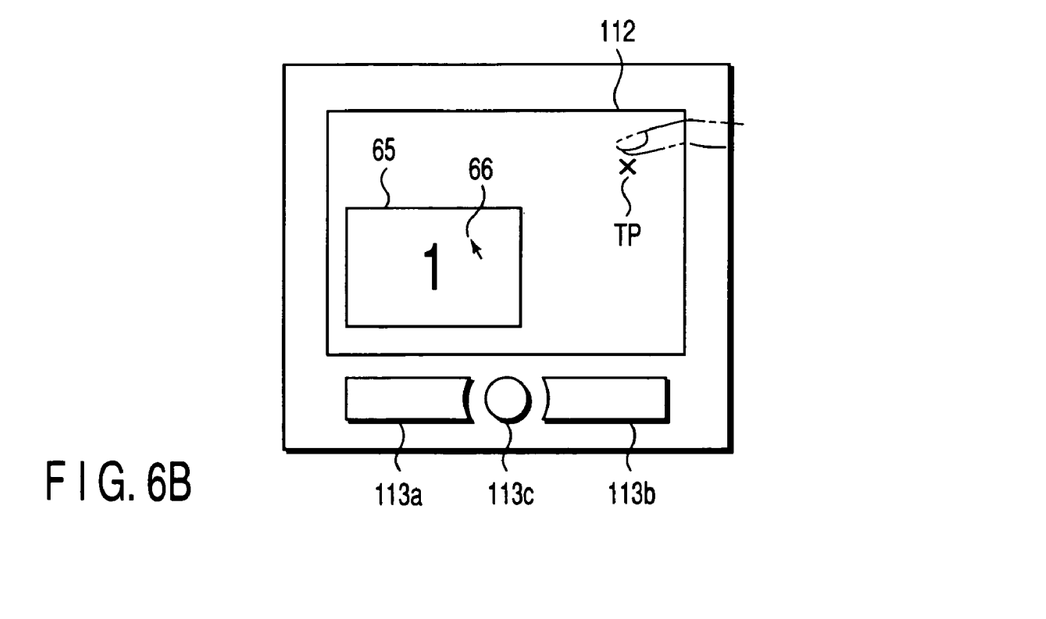
Figure 7A:
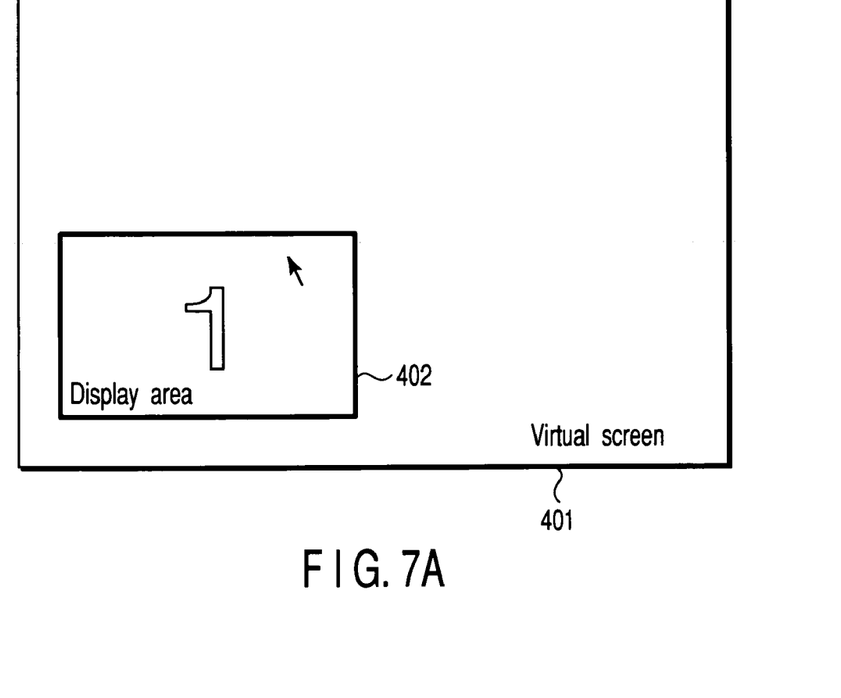
FIGS. 7A and 7B are views showing a display transition of a main display window on the virtual screen for explaining the positioning operation of the mouse pointer.
Figure 7B:
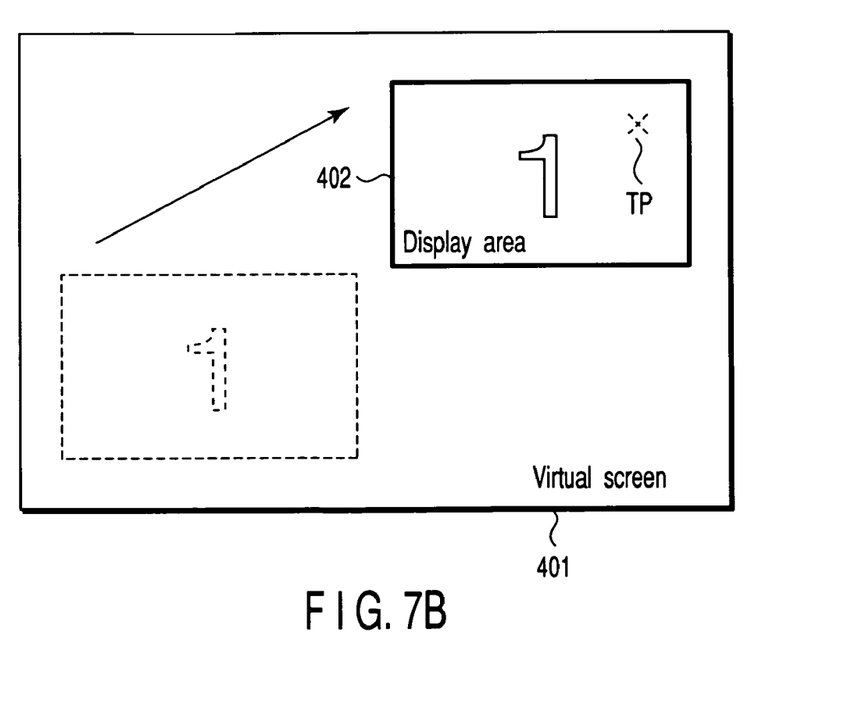

FIGS. 6A and 6B and FIGS. 7A and 7B are views for explaining the positioning operation of the mouse pointer in the embodiment of the present invention. FIGS. 6A and 6B show operation examples on the sub display device 112, and FIGS. 7A and 7B show a display transition of the main operation screen on the virtual screen in accordance with the operation of FIGS. 6A and 6B.

When the sub display device 112 is in the ordinary pointing function following the mouse setting program, that is, the pointing operation input mode (default mode) which enables the mouse pointer on the main display device 121 to move by sliding a finger on the sub display device 112, if the middle button 113*c* is operated as shown in FIG. 6A, the sub display device 112 switches to the mouse pointer positioning function (mouse pointer touch operation input mode) through one-touch operation on the virtual screen, and as shown in FIG. 6B, an image of the virtual screen is displayed on the sub display device 112. In this embodiment, the image of the virtual screen clearly indicating an area (area surrounding a numeric value 1) 65 of the main operation screen displayed on the main display device 121 before the movement (positioning) of the mouse pointer, and the position of a mouse pointer 66 in the area 65 is displayed on the sub display device 112. In a state where the image of the virtual screen is displayed, the movement end (positioning end) of the mouse pointer can be pointed by touching one certain point with a figure. One example of a touch operation position (pointed position for the movement end of the mouse pointer) in this case is indicated by "TP" in FIGS. 6B, 7B.

FIGS. 7A and 7B show an example of a display transition of the main display device 121 when a position in a virtual screen space outside the area 65 of the main operation screen displayed on the main display device 121 is pointed by the positioning operation (touch operation) of the mouse pointer shown in FIGS. 6A and 6B. In this embodiment, when the movement end of the mouse pointer is out of the display position of the main operation screen displayed on the main display device 121, a display position of the mouse pointer on the main operation screen displayed on the main display device 121 is set (determined) by the processing in which the display position of the main operation screen is set on the basis of the relative positions of the virtual screen and the movement end of the mouse pointer in such a manner that the relative position between the main operation screen and the mouse pointer before the mouse pointer has been moved is maintained.

An operation in the embodiment of the present invention will here be described in reference to the drawings.

After startup of the system, the sub display device 112 is in the ordinary pointing function that follows the mouse setting program, that is, the pointing operation input mode which enables the mouse pointer on the main display device 121 to move by sliding a finger on the sub display device 112. In this case, the sub display device 112 functions as a mouse pointing operation screen as shown in FIG. 6A (step S101 of FIG. 5).

In this state, when the middle button 113*c* is operated (Yes in step S102 of FIG. 5, Yes in step S103), an operation mode (function) of the sub display device 112 switches from the pointing operation input mode shown in FIG. 6A to the mouse pointer touch operation input mode which enables the mouse pointer positioning function through one-touch operation on the virtual screen (desktop entire screen) as shown in FIG. 6B (step S104 of FIG. 5). In this embodiment, the image of the virtual screen clearly indicating the area (area surrounding the numeric value 1) 65 of the main operation screen displayed on the main display device 121 before the positioning of the mouse pointer, and the position of the mouse pointer 66 in the area 65 of main operation screen is displayed on the sub display device 112.

In a state where the virtual screen (desktop entire screen) is displayed on the sub display device 112, when one certain point on this screen is touched (No in step S105 of FIG. 5, Yes in step S107), if the touched position (TP) is currently in the area 65 (area surrounding the numeric value 1) of the main operation screen displayed on the sub display device 112 (Yes in step S108 of FIG. 5), no change in made in the display position of the main display device 121 (the panning processing is not performed), and the mouse pointer displayed on the main display device 121 is moved to the movement end (positioning end) in accordance with the finger touch operation position (TP) (step S110 of FIG. 5).

On the contrary, when a position in the virtual screen space outside the display position displayed on the main display device 121 is pointed by the positioning operation (touch operation) of the mouse pointer, that is, when the movement end (positioning end) of the mouse pointer is presently out of the display position of the main operation screen displayed on the main display device 121, the display position of the mouse pointer on the main operation screen displayed on the main display device 121 is determined by the processing in which the display position of the main operation screen is quickly moved on the basis of the relative positions of the virtual screen and the movement end of the mouse pointer in such a manner that the relative position between the main operation screen and the mouse pointer before the mouse pointer has been moved is maintained.

In accordance with the display position of the main operation screen and the display position of the mouse pointer that have been determined here, the main operation screen and the mouse pointer are displayed on the main display device 121 (steps S109, S110 of FIG. 5). FIGS. 7A and 7B show an example of a transition of the main operation screen in the virtual screen displayed on the main display device 121 in this case.

After the positioning of the mouse pointer by the touch operation on the sub display device 112 described above, if the middle button 113*c* is operated again (Yes in step S105 of FIG. 5, Yes in step S106), the operation mode (function) of the sub display device 112 switches from the mouse pointer touch operation input mode which enables the mouse pointer positioning function through one-touch operation on the virtual screen to the ordinary pointing operation input mode mentioned above (returns to the default mode). In this way, every time the middle button 113*c* is operated, the ordinary pointing operation input mode and the mouse pointer touch operation input mode are alternately selected. In addition, in the ordinary pointing operation input mode state, if the button other than the middle button 113*c* is operated, predetermined processing allocated to the button is executed. For example, if the button 113*a* or 113*b* other than the middle button 113*c* is operated in the above processing, processing for the function allocated to the operated button 113*a* or 113*b* is executed (step S111 of FIG. 4).

In this way, the screen image of the entire desktop including the main operation screen displayed on the main display device 121 is displayed on the sub display device 112 as an operation screen to point the position of the mouse pointer by the touch operation, thereby making it possible to easily and quickly move (position) the mouse pointer in a wide range on the desktop in a state where position accuracy of the mouse pointer is high.

In the embodiment described above, the screen image of the entire desktop including the main operation screen displayed on the main display device 121 is displayed on the sub display device 112 as the operation screen to point the position of the mouse pointer by the touch operation, but the following configuration may also be adopted; the desktop screen image of the entire main operation screen displayed on the main display device 121 is displayed on the sub display device 112 as the operation screen to point the position of the mouse pointer by the touch operation, for example. This is effective in the positioning operation of the mouse pointer between places away from each other on the main operation screen, for example, between places in the vicinity of facing end points on the main operation screen displayed on the main display device 121.

Furthermore, the operation mode (ordinary pointing operation input mode/mouse pointer touch operation input mode) of the sub display device 112 is switched by the operation of the middle button 113*c* in the embodiment described above, but the operation mode can also be automatically returned to the ordinary pointing operation input mode (returned to the default mode) after the positioning processing of the mouse pointer by the touch operation, for example.

Still further, in the embodiment described above, when the movement end (positioning end) of the mouse pointer is presently out of the display position of the main operation screen displayed on the main display device 121, the display position of the main operation screen is set on the basis of the relative positions of the virtual screen and the movement end of the mouse pointer in such a manner that the relative position between the main operation screen and the mouse pointer before the mouse pointer has been moved is maintained, but the mouse pointer can also be displayed constantly at a predetermined position (e.g., center, corner) on the main operation screen, for example.

According to the present embodiment, there are provided an information processing apparatus and a method of operating a pointing device which realize a function operable to easily and quickly move and position a pointer in a wide range on a desktop in a state where position accuracy of the pointer is high.

While the description above refers to a particular embodiment of the present invention, it will be understood that many modifications may be made without departing from the spirit thereof. The accompanying claims are intended to cover such modifications as would fall within the true scope and spirit of the present invention. The presently disclosed embodiment is therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An information processing apparatus comprising:
   a first display device which displays a main operation screen;
   a second display device which comprises a touch pad; and
   a display controller which displays a pointer on the main operation screen, a position of the pointer being changed by the touch pad, the display controller configured to:
   display a virtual screen including the main operation screen, and
   chance a position of the main operation screen in the virtual screen based on a chance of the position of the pointer caused by the touch pad.

2. The apparatus according to claim 1, wherein when the position of the pointer is chanced to a position which is out of the main operation screen, the display controller changes the position of the main operation screen in the virtual screen to a position which is out of the main operation screen.

3. The apparatus according to claim 1, wherein when the position of the pointer has been changed, the display controller stops display of the virtual screen on the second display device.

4. The apparatus according to claim 1, wherein
   the second display device has a switching function; and
   the display controller stops display of the virtual screen when the switching function is operated in a state where the virtual screen is displayed.

5. The apparatus according to claim 1, wherein when the position of the pointer is changed to a position which is out of the main operation screen, the display controller changes the position of the main operation screen in the virtual screen in accordance with relative positions of the virtual screen and the pointer.

6. The apparatus according to claim 1, wherein when the position of the pointer is changed to a position which is out of the main operation screen, the display controller changes the position of the main operation screen in the virtual screen in such a manner that relative positions of the main operation screen and the pointer before the pointer has been changed is maintained.

7. The apparatus according to claim 1, wherein when the position of the pointer is changed to a position which is out of the main operation screen, the display controller changes the position of the main operation screen in the virtual screen so that the pointer is displayed at a fixed position in the main operation screen.

8. The apparatus according to claim 1, wherein the display controller makes the second display device display the virtual screen indicating the main operation screen in the virtual screen and the position of the pointer.

9. A control method for an information processing apparatus comprising a first display device which displays a main operation screen, a second display device which comprises a touch pad, and a display controller which displays a pointer on the main operation screen, a position of the pointer being chanced by the touch pad, comprising:
   displaying a virtual screen including the main operation screen on the second display device; and
   changing a position of the main operation screen in the virtual screen based on a change of the position of the pointer caused by the touch pad.

10. The control method according to claim 9, further comprising, when the position of the pointer is changed to a position which is out of the main operation screen, changing the position of the main operation screen in the virtual screen to a position which is out of the main operation screen.

11. The control method according to claim 9, further comprising, when the position of the pointer has been changed, stopping display of the virtual screen on the second display device.

12. The control method according to claim 9, wherein
the second display device has a switching function; and further comprising:
stopping a display of the virtual screen when the switching function is operated in a state where the virtual screen is displayed.

13. The control method according to claim 9, further comprising, when the position of the pointer is changed to a position which is out of the main operation screen, changing the position of the main operation screen in the virtual screen in accordance with relative positions of the virtual screen and the pointer.

14. The control method according to claim 9, further comprising, when the position of the pointer is changed to a position which is out of the main operation screen, changing the position of the main operation screen in the virtual screen in such a manner that relative positions of the main operation screen and the pointer before the pointer has been changed is maintained.

15. The control method according to claim 9, further comprising, when the position of the pointer is changed to a position which is out of the main operation screen, changing the main operation screen in the virtual screen so that the pointer is displayed at a fixed position in the main operation screen.

16. The control method according to claim 9, further comprising making the second display device display the virtual screen indicating the main operation screen in the virtual screen and the position of the pointer.

* * * * *

UNITED STATES PATENT AND TRADEMARK OFFICE
CERTIFICATE OF CORRECTION

PATENT NO.       : 7,292,206 B2                                                   Page 1 of 1
APPLICATION NO. : 10/767267
DATED            : November 6, 2007
INVENTOR(S)      : Numano It is certified that error appears in the above-identified patent and that said Letters Patent is hereby corrected as shown below:

Claim 1, column 8, line 14, change "chance" to --change--.

Claim 1, column 8, line 15, change "chance" to --change--.

Claim 2, column 8, line 18, change "chance" to --change--.

Claim 9, column 8, line 59, change "chance" to --change--.

Signed and Sealed this

Eighth Day of July, 2008

JON W. DUDAS
*Director of the United States Patent and Trademark Office*